United States Patent [19]

Wang

[11] Patent Number: 5,150,949
[45] Date of Patent: Sep. 29, 1992

[54] SIMULATED CUSTOM WHEELS

[76] Inventor: Mike Wang, 2049 W. 235th Pl., Torrance, Calif. 90501

[21] Appl. No.: 664,756

[22] Filed: Mar. 5, 1991

[51] Int. Cl.⁵ .......................... B60B 7/04; B60B 7/06
[52] U.S. Cl. ................................. 301/37 S; 301/37 R; 301/108 S
[58] Field of Search ............... 301/37 R, 37 S, 108 R, 301/108 S

[56] References Cited

U.S. PATENT DOCUMENTS

| 4,606,582 | 8/1986 | Warren | 301/108 S X |
| 4,787,681 | 11/1988 | Wang et al. | 301/108 S X |
| 4,881,783 | 11/1989 | Campbell | 301/108 S X |
| 4,946,228 | 8/1990 | Hsu et al. | 301/108 S X |

FOREIGN PATENT DOCUMENTS 633632 2/1928 France .......................... 301/108 S Primary Examiner—Russel D. Stormer
Attorney, Agent, or Firm—Singer & Singer

[57] ABSTRACT

A Simulated Custom Wheel suitable for vehicles having elongated studs, that can be removed and inserted without removing the wheel from the axle or requiring the insertion of a ring or plate between the lug nuts and wheel of the vehicle. The decorative wheel cover having a central cut out to clear the lug bolts, is placed against the wheel but not attached. A retainer ring having sufficient openings to clear the number of lugs but not the lug nuts themselves is placed over the wheel lugs and against the lug nuts. The retainer ring and the wheel cover are connected together to form a unitary structure. At least three new nuts are placed on selected wheel lugs extending through the openings on the retainer ring and tightened. A center wheel cover having simulated lugs and lug nuts to match the wheel is placed over the retainer ring and attached to the ring to form a complete wheel cover without the necessity of removing the lug nuts holding the wheel to the vehicle.

5 Claims, 3 Drawing Sheets

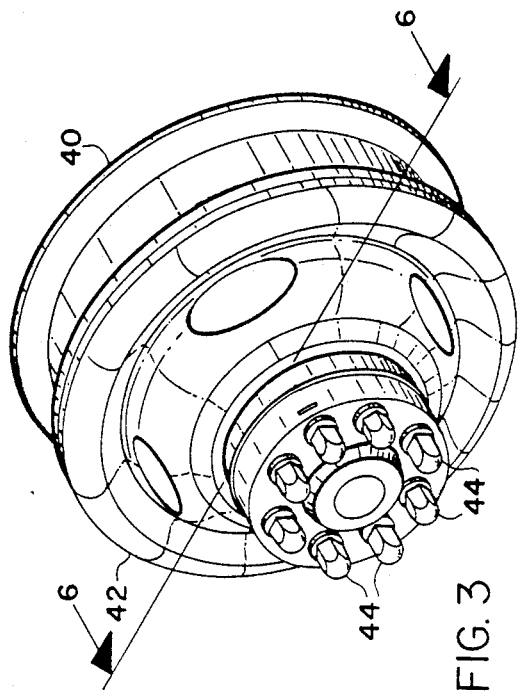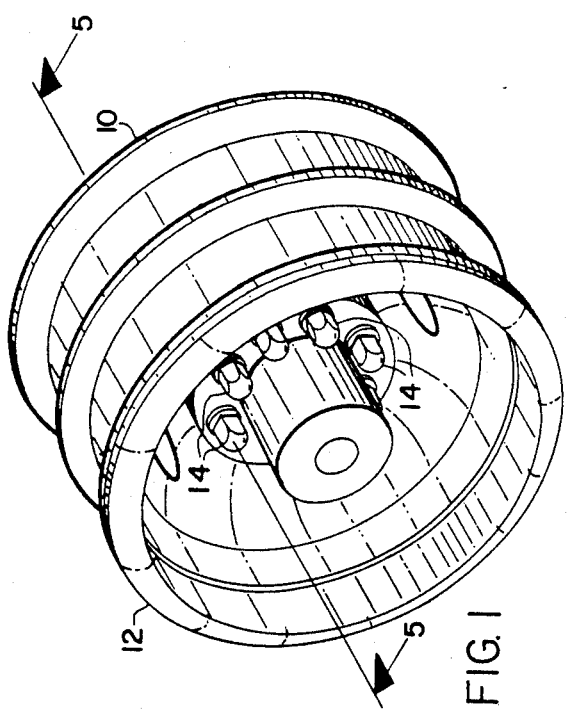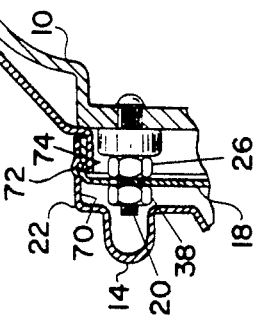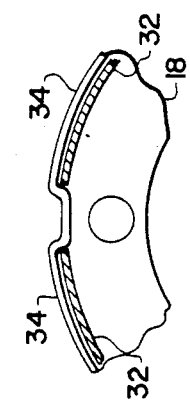

SIMULATED CUSTOM WHEELS

There is described a decorative wheel cover and more particularly a universal decorative wheel cover that is primarily adapted for use on vehicles having extended lugs as used on Ford vehicles. The decorative cover is capable of being inserted and removed without removing the lug nuts attaching the wheel to the vehicle.

In the art as practiced today, it has become quite fashionable for modern families to own and drive heavy duty vehicles such as Vans and Trucks for sport and also for everyday transportation.

The motor Van, once used only for vacation, is now used as an everyday transportation vehicle and similarly the light truck and the heavy duty truck having dual wheels in the rear are now dressed up and made very attractive with fancy paint schemes and decorative wheels so as to be very ornamental and attractive and acceptable as an everyday vehicle. It is also quite common for heavy duty truckers to make their cabs as attractive as possible and that includes chrome plating, attractive ornaments, deluxe interiors, and chrome wheels on both dual driving wheels and the forward steering wheels.

Unfortunately, it has become expensive to properly chrome all four wheels on an automobile and also to chrome the dual wheels used on trucks, Vans and motorhomes and to maintain these wheels in a pristine condition as is the want of the owner. Further, the necessity to chrome the spare wheel or wheels used on these vehicles unfortunately adds to the cost and the upkeep.

It has also become apparent to the owners of these heavy duty vehicles that removing the wheel, changing the tires, and using their vehicles in off road conditions increases the damage to the wheels which again necessitates added costs and repairs and replacement.

In an effort to lower the cost of maintaining attractive wheels to the user, the market has developed a decorative wheel covering for Vans, trucks and automobiles. These decorative wheel covers require the user to only purchase a set of four wheels for his vehicle thereby eliminating the need for a spare since the covers can be removed by the user at will. It is also possible for the user to remove the decorative wheel cover from the vehicle when the vehicles are to be used in off road conditions thereby minimizing damage to the decorative covers when the vehicles are not used in their ordinary transportation mode.

The decorative wheel cover also allows the user to enhance the appearance of the wheel and the lug nuts used to maintain the wheel on the axle. It has become very fashionable for users to place decorative lug nut covers over the vehicle lug nuts in order to enhance the size of the lug nut and give the wheel a larger appearance than it would otherwise have. This concept of using lug nut covers to cover the lug nuts of the vehicle allows the user to obtain a visual appearance of having a much larger wheel with larger lug nuts then is otherwise necessary for the vehicle itself. This lends a certain amount of machoism to the user and is highly desirable by those users wanting to enhance the appearance and the attractiveness of their vehicles.

Many of the presently available decorative wheel covers require the user to remove the lug nuts holding the wheel to the vehicle and then insert a ring or plate to which the decorative wheel cover is attached. Unfortunately, car and truck manufactures require that wheels for cars and trucks be torqued to certain specifications in order to maintain a warranty on the vehicle. Whenever a foreign object such as a plate or ring in inserted between the lug nut and the wheel, it becomes impossible to accurately torque the lug nut because of deformation of the added material. This has caused car and truck manufactures to void all warranties whenever decorative wheel covers are used that contain plates, rings or spacers between the lug nuts and the wheel.

An example of the prior art is U.S. Pat. No. 4,606,582 issued Aug. 19, 1986 to Perry A. Warren and which is entitled "Decorative Wheel Covering". This patent discloses how the decorative wheel cover can be placed against the wheel of either a Van, truck, or automobile to enhance the attractiveness of the wheel and at a cost that is less then producing a chrome wheel with chrome lug nuts. Unfortunately, a ring is used against the wheel which would void the car or truck warranty.

In the present invention, there is described a universal simulated custom wheel particularly adapted for use with Ford vehicles having extended lugs and which can be used on the front wheel or on the dual rear wheels and which provides the necessary covering of both the wheel and the wheel lug nuts.

The decorative wheel cover has a substantially concave shape that is placed adjacent the wheel but does not not touch the wheel. A retaining ring having a plurality of openings corresponding to each stud used is provided to fit over each of the studs and bear against each of the wheel lug nuts. The opening are only large enough to accept the studs but not the lug nuts. The retaining ring may be attached to the wheel cover along the periphery or the ring and the cover may be supplied as two separate parts and attached together after the ring is attached to the studs.

The retaining ring abuts each of the lug nuts and is held in place by the use of at least three addition nuts that secures the ring to the three selected studs protruding through the opening on the ring. More then three additional nuts may be used if desired.

In the preferred embodiment the ring and the wheel cover are supplied as separate elements and attached together when the ring is attached to the studs. In one embodiment the ring contains a shoulder along the periphery and the wheel cover is attached to the shoulder of the ring by either a plurality of set screws or by indents on the cover and the ring that mate and lock together thereby forming a unitary structure fixedly attached to the studs holding the wheel.

A center cap cover having a matching flanged rim on he pheriphery and covering the center portion of the wheel, contains large simulated lug nuts and studs to match those on the wheel. The center cap cover is placed over the retainer ring and is frictionally attached to the retainer ring to complete the assembly for covering the wheel.

In the preferred embodiment, the retainer ring contains a flanged rim on the periphery to define a shoulder portion adapted to frictionally engaged the shoulder on the center cap cover. Other attaching means may be used such as set screws, locking pins and the like. In order to remove the decorative wheel cover it is only necessary to first remove the front center cap cover from the retainer ring and then remove the three nuts holding the retainer ring to the wheel studs to thereby remove the retainer ring and the decorative wheel cover.

In other words, the improved simulated wheel cover is capable of being inserted or removed by the owner without removing the lug nuts, the wheel or inserting any foreign member between the lug nuts holding the wheel and the wheel itself. Another advantage is, that the improved wheel coverering may be inserted or removed without having to place the vehicle on jacks. In this manner all car warranties are preserved.

Further objects and advantages will be made more apparent by referring now to the accompanying drawings where there is shown:

FIG. 1 is a perspective drawing illustrating a simulated custom wheel created for use on the rear dual wheels of a vehicle;

FIG. 3 is a perspective drawing illustrating a simulated custom wheel created for use on the front wheels of a vehicle;

FIG. 5 is a partial cross-section taken along lines 5—5 of FIG. 1;

FIG. 6 is a cross sectional view showing another embodiment that uses a set screw for attaching the cover to the flange on the retainer ring; and FIG. 7 is a partial cross-section taken along lines 6—6 of FIG. 3.

The universal decorative wheel covers described herein is adaptable for use with Ford wheels or any other vehicle having extended lugs and is intended to provide a covering for single wheels or dual wheels whether they are automotive wheels or light trucks wheels or Van wheels.

Up to the present time, it has been impossible for a manufacturer to produce a universal wheel cover capable of being used on any vehicle without placing a ring between the lug nuts holding the wheel and the wheel.

Referring now to FIG. 1, there is shown an illustration of a dual wheel 10 having a wheel cover 12 apparently held in place by lug nuts 14. In reality, FIG. 1 illustrates a complete simulated custom wheel in which the wheel 10 is covered by apparent lug nuts 14 which are in reality decorative lug nut covers which actually cover the lug nuts and thereby present a more pleasing appearance. The wheel cover 12 and the apparent lug nuts 14 are chrome covered and the size of the covers 14 is chosen in order to give the wheel a more massive appearance dictated only by the caprice of the owner.

The exterior surface of the wheel cover 12 is chrome plated to a high finish in order to obtain the pleasing appearance desired by the user.

Figure 2:
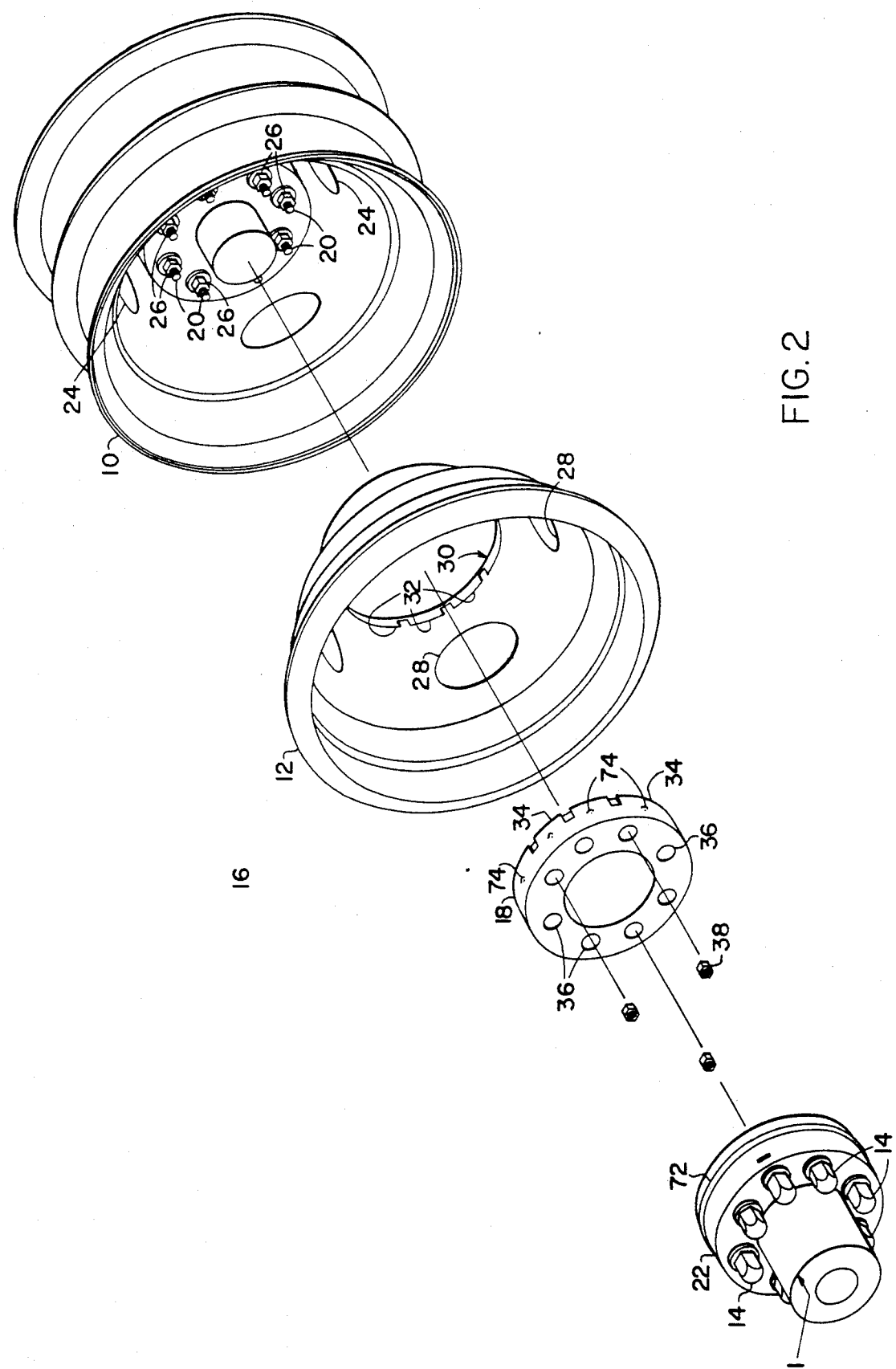
FIG. 2 is an exploded view of a wheel having a decorative cover as shown in FIG. 1.

Referring now to FIG. 2, there is shown an exploded view of a wheel assembly 16 of the type illustrated in FIG. 1. There is shown a wheel 10, a wheel cover 12, a retainer ring 18, a plurality of actual lug nuts 20 and a center hub 22 having a plurality of simulated lug nuts 14.

The wheel 10 is conventional in character and contains a plurality of openings 24, for accessing air to the brake drums and a plurality of holes located in a circle for allowing a plurality of studs 26 attached to the brake drum to pass therethrough. Located adjacent to the wheel 10 is the wheel cover 12 which also contains a plurality of openings 28 adapted to match with the openings 24 on the wheel 10 in order to allow cooling air to pass through to the brake drum. The wheel cover 12 contains a central opening 30 and a circular flange 32 facing outward of the wheel 10 for mating in a holding relationship with a similar flange 34 located on the circular pheriphery of the retainer ring 18.

The retainer ring 18 contains a plurality of openings 36, one for each wheel lug, located in a circle for accepting each lug. The individual openings 36 are large enough to accept the protruding lug but small enough to prevent the actual lug nuts 26 from passing through the opening. The retainer ring 18 is located in a contacting relationship on the actual lug nuts 26 with all wheel lugs 20 protruding through the openings 36 on the ring. At east three additional lug 38 are placed on any three protruding wheel lugs 20 to hold the retainer ring 18 against the actual lug nuts 26.

The flange 34 located on the retainer ring 18 is placed over the flange 32 located on the wheel cover 12 thereby locking the ring 18 to the wheel cover 12. The flanged rim 34 on the periphery of the ring 18 defines a shoulder portion that is adapted to face and mate with the flange 32 on the cover 12 for locking the ring 18 to the cover 12.

Because of manufacturing economies the cover 12 and the ring 18 are constructed of separate parts; however, it is possible to construct a single structure comprising the cover 12 and the ring 18 which is then secured the three nuts 38 to the wheel lugs 20. In the preferred embodiment ring 18 is shown attached to the cover 12 by the friction engagement between the flange 34 on ring 18 and the flange 32 on the cover 12; however, other attachment means such as a set screw could be effectively used.

The exposed portions visible to the viewer include the wheel cover 10, the center cap cover 14 containing the decorative lug nut covers 14 which are all chrome plated and fashioned to be as attractive as possible.

For those users desiring the appearance of a large lug nut, it is only necessary to use a larger size decorative lug nut cover 14 to give the massive visual impression that some users desire.

Referring now to FIG. 3, there is shown an illustration of a front wheel drive having a single wheel 40 having a wheel cover 42 apparently held in place by lug nuts 44. In reality, FIG. 3 illustrates a complete simulated custom wheel in which the wheel 40 is covered by apparent lug nuts 44 which are in reality decorative lug nut covers which cover the actual lug nuts and thereby present a more pleasing appearance. The wheel cover 40 and the apparent lug nuts 44 are chrome covered and the size of the covers 44 is chosen in order to give the wheel a more massive appearance dictated only by the caprice of the owner.

Figure 4:
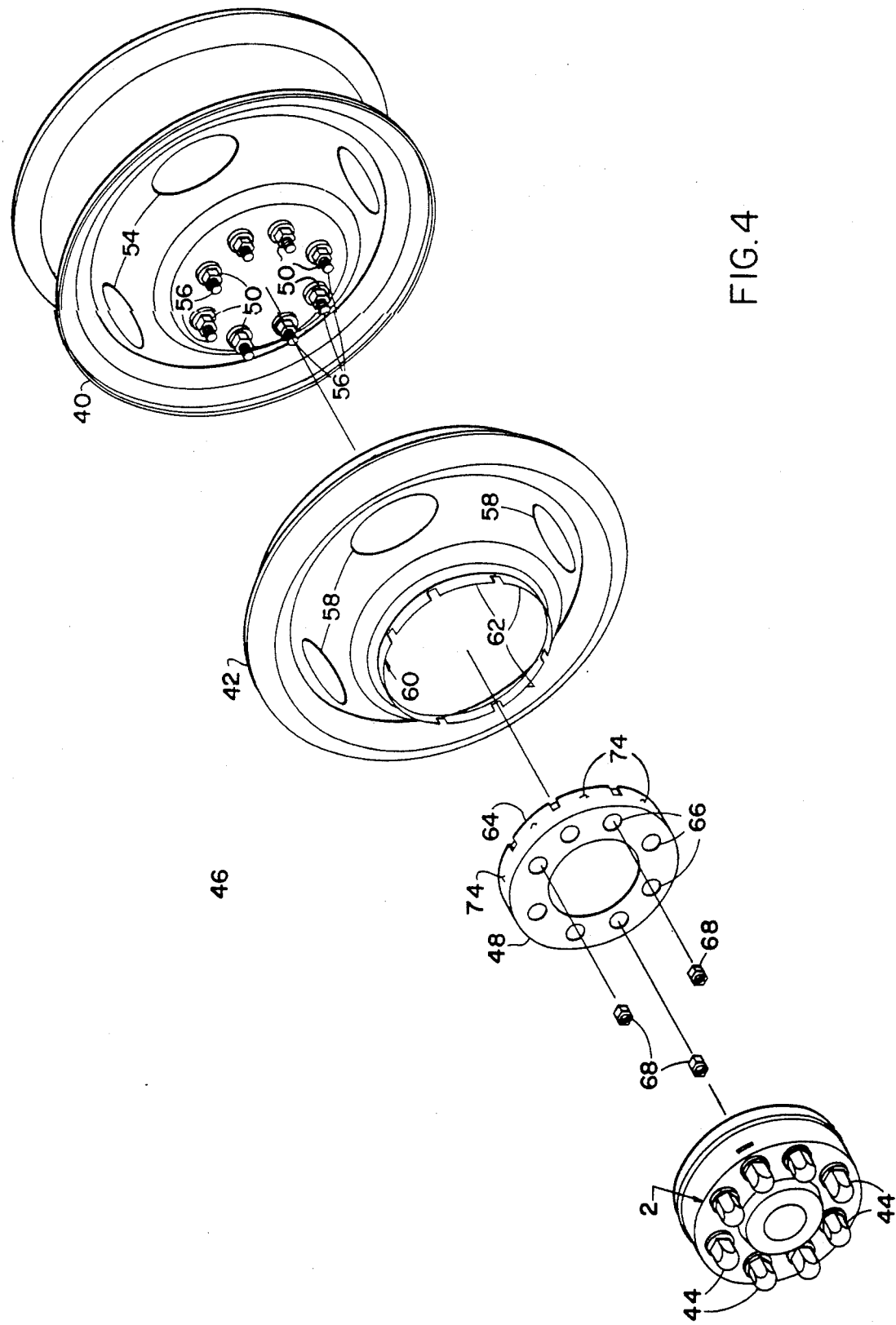
FIG. 4 is an exploded view of a wheel having a decorative cover as shown in FIG. 3.

Referring now to FIG. 4, there is shown an exploded view of a wheel assembly 46 of the type illustrated in FIG. 3. There is shown a wheel 40, a wheel cover 42, a retainer ring 48, a plurality of actual lug nuts 50 and a center hub 52 having a plurality of simulated lug nuts 44.

The wheel 40 is conventional in character and contains a plurality of openings 54, for accessing air to the brake drums and a plurality of holes located in a circle for allowing a plurality of studs 56 attached to the brake drum to pass therethrough. Located adjacent to the wheel 40 is the wheel cover 42 which also contains a plurality of openings 58 adapted to match with the openings 54 on the wheel 40 in order to allow cooling air to pass through to the brake drum. The wheel cover 42 contains a central opening 60 and a circular flange 62 facing outward of the wheel 10 for mating in a holding relationship with a similar flange 64 located on the circular pheriphery of the retainer ring 48.

The retainer ring 48 contains a plurality of openings 66, one for each wheel lug, located in a circle for accepting each lug. The individual openings 66 are large enough to accept the protruding lug but small enough to prevent the actual lug nuts 56 from passing through the opening. The retainer ring 48 is located in a contacting relationship on the actual lug nuts 56 with all wheel lugs 50 protruding through the openings 66 on the ring. At least three additional nuts 68 are placed on any three protruding wheel lugs 50 to hold the retainer ring 48 against the actual lug nuts 56.

The flange 64 located on the retainer ring 48 is placed over the flange 62 located on the wheel cover 42 thereby locking the ring 48 to the wheel cover 42. The flanged rim 64 on the periphery of the ring 48 defines a shoulder portion that is adapted to face and mate with the flange 62 on the cover 42 for locking the ring 48 to the cover 42.

Referring now to FIG. 5, there is shown a partial crosssection taken along lines 5—5 of FIG. 1 for illustrating how the retainer ring 18 fits over the studs 20 and against the wheel lugs 26. The flange 32 on the wheel cover mates with the flange 34 on the periphery of the retainer ring 18 to form a unitary structure. In the preferred embodiment, the connection is frictional; however, the retainer ring 18 and the wheel cover could be constructed of a single part.

The center cap cover 22 has a flange 70 containing a ring 72 that mates with an embossment 74 located on the flange 34 of retaining ring 18. In this way the retainer ring 18 and the center cap cover 22 are frictionally held together.

Referring now to FIG. 6 there is shown another embodiment in which the ring 18 is attached to the center cap cover 22 by means of a set screw 80.

Referring now to FIG. 7, there is shown a partial crosssectional view illustrating the frictional connection between the flange 34 on the retainer ring 18 and the flange 32 on the ring 30 of the wheel cover 12. The wheel cover 12 is actually supported by he retainer ring 18. As mentioned above the ring 18 and the cover 12 could be constructed of a single part; however, the cost of such a complex part is not justified since making two parts accomplishes the same purpose and at a much cheaper cost.

The description of the connection in FIGS. 5, 6 and 7 are the same for both the rear wheel as shown in Figure as shown for the front wheel in FIG. 4.

In this fashion the user can obtain simulated custom wheels for his single or dual wheel and can have the illusion of a large installation with large lug nuts and still use all the original equipment as supplied by the manufacture and without removing the wheels or removing the wheel lug nuts.

I claim:

1. A universal decorative wheel covering for use with automotive or truck wheels that can be inserted and removed without first removing the lug nuts holding the wheels to the drum of the vehicle comprising
   a decorative wheel cover having a substantially concave shape and a circular central opening having a flanged rim;
   a circular retaining ring having a flanged rim on the periphery adapted to mate with the flanged rim on said wheel cover for holding and supporting said wheel cover;
   said retainer ring having a a plurality of openings of sufficient diameter to allow each stud to pass through but small enough to prevent the lug nuts from passing through, located against all of the lug nuts;
   at least three nuts for securing said retaining ring to at least three studs for securing said ring against the lug nuts holding the wheel to the drum; and
   a universal center hub having simulated lug nuts and lug covers, one for each stud whereby the wheel is covered by the cover and the lug nuts and studs are covered by the simulated lug nut covers;
   said universal center hub having a flanged rim on the periphery adapted to mate with the flanged on said retainer ring whereby said ring supports and holds said hub and said cover.

2. A combination according to claim 1 in which said decorative lug nuts are fixedly attached to said universal center hub and completely cover the studs and lug nuts holding the wheel.

3. A combination according to claim 1 in which said retainer ring is frictionally attached to said center hub and said wheel cover.

4. A combination according to claim 1 in which said retainer ring is attached to said center hub and said wheel cover by suitable set screws.

5. A universal decorative wheel covering according to claim 1 in which the flange on said retainer ring has a plurality of embossments and said flange on said hub contains a ring for accepting each of said embossments for frictionally holding said hub to said ring.

* * * * *